United States Patent
Zhang

(10) Patent No.: US 10,405,188 B2
(45) Date of Patent: Sep. 3, 2019

(54) RELAY SELECTION ROUTING METHOD AND RELAY SELECTION ROUTING APPARATUS BASED ON DIRECT COMMUNICATION OF TERMINAL

(71) Applicant: Yulong Computer Telecommunication Scientific (Shenzhen) Co., Ltd., Shenzhen, Guangdong (CN)

(72) Inventor: Chenlu Zhang, Guangdong (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 160 days.

(21) Appl. No.: 15/414,471

(22) Filed: Jan. 24, 2017

(65) Prior Publication Data
US 2017/0142594 A1 May 18, 2017

Related U.S. Application Data

(63) Continuation-in-part of application No. PCT/CN2014/087841, filed on Sep. 29, 2014.

(30) Foreign Application Priority Data

Jul. 31, 2014 (CN) .......................... 2014 1 0375036

(51) Int. Cl.
*H04W 16/14* (2009.01)
*H04W 4/70* (2018.01)
(Continued)

(52) U.S. Cl.
CPC ............. *H04W 16/14* (2013.01); *H04L 45/02* (2013.01); *H04L 45/26* (2013.01); *H04W 4/70* (2018.02);
(Continued)

(58) Field of Classification Search
CPC ............................. H04Q 7/00; G08G 5/0034
(Continued)

(56) References Cited

U.S. PATENT DOCUMENTS

2003/0189926 A1* 10/2003 Watanabe ........... H04L 12/5601
370/389
2006/0083243 A1 4/2006 Igarashi et al.
(Continued)

*Primary Examiner* — Iqbal Zaidi
(74) *Attorney, Agent, or Firm* — ScienBiziP, P.C.

(57) ABSTRACT

The present invention provides a relay selection routing method based on direct communication of a terminal, applied to a base station, including: establishing a database of a topological structure of a direct communication terminal on a network side; when a change of the topological structure is detected, updating the database of the topological structure; when a direct communication service request is received, determining a data sending path and a destination relay node corresponding to the direct communication service request according to the database of the topological structure, sender information and receiver information of the direct communication service request and a preset selection principle; and establishing a direct communication data sharing network corresponding to the direct communication service request according to the data sending path and the destination relay node. Correspondingly, the present invention further provides a relay selection router based on direct communication of a terminal.

16 Claims, 6 Drawing Sheets

(51) Int. Cl.

| | | |
|---|---|---|
| *H04W 8/00* | (2009.01) | |
| *H04W 40/24* | (2009.01) | |
| *H04W 40/12* | (2009.01) | |
| *H04W 40/30* | (2009.01) | |
| *H04W 88/04* | (2009.01) | |
| *H04L 12/751* | (2013.01) | |
| *H04L 12/721* | (2013.01) | |
| *H04W 76/14* | (2018.01) | |
| *H04W 84/18* | (2009.01) | |
| *H04L 12/717* | (2013.01) | |

(52) U.S. Cl.
CPC ......... *H04W 8/005* (2013.01); *H04W 40/246* (2013.01); *H04W 40/248* (2013.01); *H04W 76/14* (2018.02); *H04L 45/42* (2013.01); *H04W 40/12* (2013.01); *H04W 40/30* (2013.01); *H04W 84/18* (2013.01); *H04W 88/04* (2013.01)

(58) Field of Classification Search
USPC .................................................. 370/252–339
See application file for complete search history.

(56) References Cited

U.S. PATENT DOCUMENTS

| | | | |
|---|---|---|---|
| 2008/0126403 A1* | 5/2008 | Moon | ............... G06F 17/30575 |
| 2013/0183924 A1* | 7/2013 | Saigh | .................... H04W 4/029 |
| | | | 455/404.2 |
| 2014/0094180 A1 | 4/2014 | Zhou et al. | |
| 2014/0112194 A1 | 4/2014 | Novlan et al. | |

\* cited by examiner

RELAY SELECTION ROUTING METHOD AND RELAY SELECTION ROUTING APPARATUS BASED ON DIRECT COMMUNICATION OF TERMINAL

FIELD OF THE INVENTION

The present invention relates to the technical field of terminals, and particularly to a relay selection routing method based on direct communication of a terminal and a relay selection routing apparatus based on the direct communication of the terminal.

BACKGROUND OF THE INVENTION

Routing algorithms are the core technology of an Internet network layer, which mainly solves the problem of how to select an appropriate path and an appropriate router to forward data in an IP network. The current routing algorithms are divided into an active routing algorithm (a table-driven routing protocol) and on-demand routing (a reactive routing protocol).

Active routing protocol: an active routing discovery strategy is similar to the traditional routing protocol, that is, each node of the network should periodically send the latest routing information to other nodes, and each node should maintain one or more routing tables to store the routing information. When a network topological structure changes, the node will broadcast routing update information in the whole network, and thus each node can continuously acquire network information. Representative protocols of the active routing protocol include DSDV (Destination-Sequenced Distance. Vector, destination-sequenced distance vector), HSR (Hierarchical State Routing, hierarchical state routing), and the like; and on-demand routing protocol: unlike the active routing protocol, the on-demand routing is created by a source node only when the routing is required, so the topological structure and routing table contents are established according to demands, and may be only a part of the entire topological structure information. The routing is maintained in a communication process and is not maintained anymore after the communication is completed. The representative protocols thereof include: a DSR (dynamic source routing protocol), an AODV (Ad hoc on-demand distance vector routing protocol), a TORA (temporally ordered routing algorithm).

In these current routing algorithms, the routing problem of a distributed system is usually processed, that is, there is no centralized control node between routers to uniformly maintain and process the routing tables.

In a direct communication network (D2D, Device to Device), the network topological structure changes, and terminals in the direct communication network work under the centralized control (or partial control) of a telecommunication network. Therefore, related routing discovery and routing maintenance mechanisms in the routing algorithm need to be changed correspondingly to adapt to data relay node and path selection of a D2D data sharing network.

As shown in FIG. 1, a possible topological structure in the D2D data sharing network is represented. UEs (terminals) A, B are a data source UE and a data destination receiving UE respectively; and UEs C, D, E are potential data relay UEs.

The channel states between the UEs can be acquired by initiating a Discovery flow between the UEs or measuring pilot frequency. It can be seen from FIG. 1 that, according to a channel detection result, a link C-to-B has worse quality, and thus cannot establish direct communication. Links A-to-C, A-to-D, D-to-E, E-to-B meet the requirements of the direct communication, and thus can establish the direct communication.

If the aforementioned selection of an available path and a relay node is completed according to the "on-demand routing protocol" algorithm (e.g., the DSR, the AODV) of the current Ad-Hoc (point-to-point network), the following steps need to be implemented:

when needing to send data, a terminal A initiates a routing discovery flow, that is, sends a broadcast to all accessible UEs and inquires whether there is an available routing path accessing to a terminal B.

1. If the UE (e.g., UE D) receiving a routing discovery data packet does not have the available path accessing to the terminal B, it can forward the broadcast as well until the usable path accessing to the B is found; and 2. if the UE (e.g., UE E) receiving the routing discovery data packet has the available path accessing to the terminal B, the terminal feeds back a reply message so as to establish a path from the A to the B.

If according to the "active routing protocol algorithm" of the current Ad-Hoc, each node periodically transmits a local routing table to neighboring nodes, or transmits the routing information thereof to the neighboring nodes, when the routing table thereof changes.

No matter which aforementioned routing algorithm is adopted, due to massive invalid broadcasts generated during the routing discovery broadcast process, a larger signaling cost burden will be caused. Moreover, the process is unlikely to converge, and thus a larger delay will be generated in the entire process of path selection.

Therefore, a novel technical solution is needed to avoid massive signaling overheads caused by flooding routing in the existing routing algorithms, reduce unnecessary signaling overheads caused by broadcast in an overlarge range when the topological structure is established, and improve the timeliness of a database of the topological structure.

SUMMARY OF THE INVENTION

Based on the aforementioned problems, the present invention provides a novel technical solution, which can avoid massive signaling overheads caused by flooding routing in the existing routing algorithms, reduce unnecessary signaling overheads caused by broadcast in an overlarge range when a topological structure is established, and improve the timeliness of a database of the topological structure.

In view of this, the present invention provides a relay selection routing method based on direct communication of a terminal, applied to a base station, including: establishing a database of a topological structure of a direct communication terminal on a network side; when a change of the topological structure is detected, updating the database of the topological structure; when a direct communication service request is received, determining a data sending path and a destination relay node corresponding to the direct communication service request according to the database of the topological structure, sender information and receiver information of the direct communication service request and a preset selection principle; and establishing a direct communication data sharing network corresponding to the direct communication service request according to the data sending path and the destination relay node.

In the technical solution, the database of the topological structure is established on the network side by a topology discovery process, and when the topological structure changes, the database is updated by a topology update process. When service demands triggered by a network or initiated by the terminal arrive, a path selection and relay selection process is carried out according to the existing database, and the establishment of the direct communication data sharing network is completed at last, in this way, massive signaling overheads caused by flooding routing in the existing routing algorithms can be avoided, and unnecessary signaling overheads caused by broadcast in an over-large range when the topological structure is established can be reduced.

In the aforementioned technical solution, preferably, the establishing a database of a topological structure of a direct communication terminal on a network side specifically includes: sending a topology discovery request to at least one terminal within the coverage of the base station, so that the at least one terminal carries out channel measurement according to the topology discovery request; receiving topology discovery response fed back by the at least one terminal after carrying out the channel measurement; and establishing the database of the topological structure of the direct communication terminal according to the topology discovery response.

In the aforementioned technical solution, preferably, the topology discovery request contains at least one of or a combination of a relevant threshold constraining the topology discovery response, time-frequency domain resources of the channel measurement, a potential channel measurement range and a channel measurement mode.

In the technical solution, the database of the topological structure of the direct communication terminal is established on the network side by the topology discovery process, wherein the topology discovery process can be directly triggered by the network side, that is, the topology discovery request is triggered by a network side (e.g., the base station) event or periodically, the topology discovery request is released to at least one terminal within the jurisdiction, and the topology discovery request has the following features: 1, the topology discovery request contains the relevant threshold constraining the topology discovery response. If the quality of a channel is greater than or equal to a certain threshold M, the channel is marked as a first priority channel; if the quality of the channel is less than the threshold M and is greater than or equal to a threshold N, the channel is marked as a second priority channel; 2, the topology discovery request contains the time-frequency domain resources of the channel measurement, such as the time-frequency domain resources where a channel detection discovery signal is located (including a Discovery sending period or the like) or the time-frequency domain resources where measurement pilot frequency is located (including a pilot frequency period or the like); and 3, the topology discovery request contains the potential channel measurement range, and this step can be implemented by just activating a measured/measurement terminal within a specific range to send the Discovery or special pilot frequency; the base station can confirm an approximate range of the channel measurement according to position information in advance, for example, only carries out the channel measurement on the terminal that is away from a terminal A within a range of F meters; and the channel measurement is only carried out on a part of terminals according to an upper layer strategy. For example, the channel measurement is only carried out on a part of trusty terminals according to a certain data relay node selection limiting rule.

In the aforementioned technical solution, preferably, the establishing a database of a topological structure of a direct communication terminal on a network side specifically includes: setting a topology discovery parameter for at least one terminal within the coverage of the base station, so that the at least one terminal carries out channel measurement according to the topology discovery parameter; receiving topology discovery response fed back by the at least one terminal after carrying out the channel measurement; and establishing the database of the topological structure according to the topology discovery response.

In the aforementioned technical solution, preferably, the topology discovery parameter contains at least one of or a combination of a triggering period of the topology discovery response, time-frequency domain resources of the channel measurement, a triggering condition of the topology discovery response and a channel measurement mode.

In the technical solution, the database of the topological structure of the direct communication terminal is established on the network side by the topology discovery process, wherein the topology discovery process can be triggered by the terminal, and the terminal actively initiates the topology discovery process according to the parameter set by the base station through "topology discovery parameter setting". The topology discovery parameter contains at least one of: 1, the triggering period; 2, preset time-frequency domain resources of the channel measurement, such as the time-frequency domain resources where the channel detection discovery signal is located (including the Discovery sending period or the like) or the time-frequency domain resources where the measurement pilot frequency is located (including the pilot frequency period or the like); and 3, the event triggering condition. For example, the terminal A has data greater than or equal to a threshold E mega to be sent.

In the aforementioned technical solution, preferably, the channel measurement mode includes an active channel measurement mode and a passive channel measurement mode, when the channel measurement mode is the active channel measurement mode, each of the at least one terminal actively sends discovery information, and other terminals surrounding each terminal respectively reply discovery response to the corresponding terminal after receiving the discovery information, so that each terminal carries out channel evaluation according to the discovery response; and when the channel measurement mode is the passive channel measurement mode, each of the at least one terminal passively receives the discovery information sent by the surrounding other terminals, so that each terminal carries out channel evaluation according to the discovery information.

In the technical solution, no matter the topology discovery process is triggered by the terminal or the network side, when the terminal carries out channel detection, the detection thereof has active and passive detection mechanisms. The passive detection mechanism is that a discovery party passively receives the discovery information sent by the surrounding terminals, knows which terminals are nearby after receiving the information and can approximately know the channel quality. The active detection mechanism is that the discovery party actively sends the discovery information, and the surrounding terminals reply the response after receiving the discovery information, to notify the discovery party of their existence surrounding the same.

In the aforementioned technical solution, preferably, the topology discovery response includes node identifier information of a measurement terminal and a measured terminal, which carry out the channel measurement, a time label of the channel measurement, channel feature information and failure feature information.

In the technical solution, the topology discovery response includes, but not limited to, the node identifier information of the measurement terminal and the measured terminal, which carry out the channel measurement, the time label of the channel measurement, the channel feature information and the failure feature information, wherein node identifiers feed back the node identifier information of the measurement terminal and the measured terminal. The time label is time information indicating the completion of the current measurement, and the information can be either absolute time information or relative time information (e.g., increasing serial numbers of maintenance). Failure features are used for representing relevant parameters of the timeliness of the current channel measurement, for example, a moving speed of the terminal and the like, and the network side controls the update frequency of the topological structure maintained by the network side according to the information. The channel feature information is used for representing the state of the channel, and can include pilot frequency receiving quality/strength, a delay evaluation value, etc.

In the aforementioned technical solution, preferably, the relay selection routing method further includes: parsing the failure feature information from the topology discovery response, and judging the time or frequency of updating the database of the topological structure according to the failure feature information.

In the technical solution, when a position change on the terminal side is larger, and when the network side can judge that the position change causes the change of the topological structure, the topological structure can be directly updated, but when the position change on the terminal side is smaller, and when the network side cannot directly judge the change of the topological structure, the time or frequency of updating the database of the topological structure is judged.

In the aforementioned technical solution, preferably, the establishing a data sharing network for direct communication of the terminal corresponding to the data service sharing request according to the data sending path and the destination relay node specifically includes: releasing a path establishment command according to the data sending path and the destination relay node to establish the data sharing network for the direct communication of the terminal corresponding to the data service sharing request according to the released path establishment command.

In the aforementioned technical solution, preferably, the path establishment command includes an identifier of the destination relay node, time-frequency resources where the direct communication of the terminal is located and an effective time of the data sending path.

In the technical solution, the network side releases the time-frequency resources where the direct communication of the terminal is located and the effective time of the data sending path, so that a relay terminal can successfully establish the data sharing network according to the time-frequency resources and the effective time of the data sending path.

In the aforementioned technical solution, preferably, the preset selection principle includes a minimum hop principle, a maximum throughput principle and/or a minimum delay principle.

In the technical solution, the network side carries out path selection according to the maintained database of the topological structure and relevant link feature information. The network side can carry out the path selection according to the following principles or the combination of multiple principles: the minimum hop principle, the maximum throughput principle and the minimum delay principle, etc.

In the aforementioned technical solution, preferably, the relay selection routing method further includes: sending the database of the topological structure to the database of a superior topological structure of the network side through interfaces between the base stations periodically or in a time triggered manner, and receiving the database of the superior topological structure sent by the database of the superior topological structure of the network side; and if there is no data sending path corresponding to the direct communication service request in a current service area corresponding to the network side, sending a path discovery request to the database of the superior topological structure of the network side; or, if there is no data sending path corresponding to the direct communication service request in the current service area corresponding to the network side, broadcasting the path discovery request to the other base stations; or, sending the database of the topological structure to the other base stations through the interfaces between the base stations periodically or in a time triggered manner, and receiving the databases of the corresponding topological structures sent by the other base stations to realize the synchronization of information of the topological structures.

In the technical solution, when there is no available path of a relevant destination terminal in the current service area, the path discovery request is sent to the database of the superior topological structure of the network side to acquire a cross-regional topological structure; or when there is no available path of the relevant destination terminal in the current service area, the path discovery request is broadcasted to neighbor base stations; or the mastered topological information is mutually synchronized through the interfaces between the base stations periodically or in a time triggered manner, so that the service base station has more comprehensive global topological structure information.

Specifically, after the data sharing network is established, in a data sharing process, if the change of the topological structure is detected and the change influences the path having been selected by the current user, a path update request is sent to transfer to other available paths to carry out data sharing so as to guarantee smooth data sharing. According to another aspect of the present invention, a relay selection routing apparatus based on direct communication of a terminal is further provided, applied to a base station, including: a database establishment unit, used for establishing a database of a topological structure of a direct communication terminal on a network side; an update unit used for, when a change of the topological structure is detected, updating the database of the topological structure; a determining unit used for, when a direct communication service request is received, determining a data sending path and a destination relay node corresponding to the direct communication service request according to the database of the topological structure, sender information and receiver information of the direct communication service request and a preset selection principle; and a network establishment unit, used for establishing a direct communication data sharing network corresponding to the direct communication service request according to the data sending path and the destination relay node.

In the technical solution, the database of the topological structure is established on the network side by a topology discovery process, and when the topological structure changes, the database is updated by a topology update process. When service demands triggered by a network or initiated by UEs arrives, a path selection and relay selection process is carried out according to the existing database, and the establishment of the direct communication data sharing network is completed at last, in this way, massive signaling overheads caused by flooding routing in the existing routing algorithms can be avoided, and unnecessary signaling overheads caused by broadcast in an overlarge range when the topological structure is established can be reduced.

In the aforementioned technical solution, preferably, the database establishment unit includes: a request sending unit, used for sending a topology discovery request to at least one terminal within the coverage of the base station, so that the at least one terminal carries out channel measurement according to the topology discovery request; a receiving unit, used for receiving topology discovery response fed back by the at least one terminal after carrying out the channel measurement; and an establishment unit, used for establishing the database of the topological structure according to the topology discovery response.

In the aforementioned technical solution, preferably, the topology discovery request contains at least one of or a combination of a relevant threshold constraining the topology discovery response, time-frequency domain resources of the channel measurement, a potential channel measurement range and a channel measurement mode.

In the technical solution, the database of the topological structure of the direct communication terminal is established on the network side by the topology discovery process, wherein the topology discovery process can be directly triggered by the network side, that is, the topology discovery request is triggered by a network side (e.g., the base station) event or periodically, the topology discovery request is released to at least one terminal within the jurisdiction, and the topology discovery request has the following features: 1, the topology discovery request contains the relevant threshold constraining the topology discovery response. If the quality of a channel is greater than or equal to a certain threshold M, the channel is marked as a first priority channel; if the quality of the channel is less than the threshold M and is greater than or equal to a threshold N, the channel is marked as a second priority channel; 2, the topology discovery request contains the time-frequency domain resources of the channel measurement, such as the time-frequency domain resources where a channel detection discovery signal is located (including a Discovery sending period or the like) or the time-frequency domain resources where measurement pilot frequency is located (including a pilot frequency period or the like); and 3, the topology discovery request contains the potential channel measurement range, and this step can be implemented by just activating a measured/measurement terminal within a specific range to send the Discovery or special pilot frequency; the base station can confirm an approximate range of the channel measurement according to position information in advance, for example, only carries out the channel measurement on the terminal that is away from a terminal A within a range of F meters; and the channel measurement is only carried out on a part of terminals according to an upper layer strategy. For example, the channel measurement is only carried out on a part of trusted UEs according to a certain data relay node selection limiting rule.

In the aforementioned technical solution, preferably, the database establishment unit includes: a setting unit, used for setting a topology discovery parameter for at least one terminal within the coverage of the base station, so that the at least one terminal carries out channel measurement according to the topology discovery parameter; a receiving unit, used for receiving topology discovery response fed back by the at least one terminal after carrying out the channel measurement; and an establishment unit, used for establishing the database of the topological structure according to the topology discovery response.

In the aforementioned technical solution, preferably, the topology discovery parameter contains at least one of or a combination of a triggering period of the topology discovery response, time-frequency domain resources of the channel measurement, a triggering condition of the topology discovery response and a channel measurement mode.

In the technical solution, the database of the topological structure of the direct communication terminal is established on the network side by the topology discovery process, wherein the topology discovery process can be triggered by the terminal, and the terminal actively initiates the topology discovery process according to the parameter set by the base station through "topology discovery parameter setting". The topology discovery parameter contains at least one of: 1, the triggering period; 2, preset time-frequency domain resources of the channel measurement, such as the time-frequency domain resources where the channel detection discovery signal is located (including the Discovery sending period or the like) or the time-frequency domain resources where the measurement pilot frequency is located (including the pilot frequency period or the like); and 3, the event triggering condition. For example, the terminal A has data greater than or equal to a threshold E mega to be sent.

In the aforementioned technical solution, preferably, the channel measurement mode includes an active channel measurement mode and a passive channel measurement mode, when the channel measurement mode is the active channel measurement mode, each of the at least one terminal actively sends discovery information, and other terminals surrounding each terminal respectively reply discovery response to the corresponding terminal after receiving the discovery information, so that each terminal carries out channel evaluation according to the discovery response; and when the channel measurement mode is the passive channel measurement mode, each of the at least one terminal passively receives the discovery information sent by the surrounding other terminals, so that each terminal carries out channel evaluation according to the discovery information.

In the technical solution, no matter the topology discovery process is triggered by the terminal or the network side, when the terminal carries out channel detection, the detection thereof has active and passive detection mechanisms. The passive detection mechanism is that a discovery party passively receives the discovery information sent by the surrounding terminals, knows which terminals are nearby after receiving the information and can approximately know the channel quality. The active detection mechanism is that the discovery party actively sends the discovery information, and the surrounding terminals reply the response after receiving the discovery information, to notify the discovery party of their existence surrounding the same.

In the aforementioned technical solution, preferably, the topology discovery response includes node identifier information of a measurement terminal and a measured terminal, which carry out the channel measurement, a time label of the channel measurement, channel feature information and failure feature information.

In the technical solution, the topology discovery response includes, but not limited to, the node identifier information of the measurement terminal and the measured terminal, which carry out the channel measurement, the time label of the channel measurement, the channel feature information and the failure feature information, wherein node identifiers feed back the node identifier information of the measurement terminal and the measured terminal. The time label is time information indicating the completion of the current measurement, and the information can be either absolute time information or relative time information (e.g., increasing serial numbers of maintenance). Failure features are used for representing relevant parameters of the timeliness of the current channel measurement, for example, a moving speed of the terminal and the like, and the network side controls the update frequency of the topological structure maintained by the network side according to the information. The channel feature information is used for representing the state of the channel, and can include pilot frequency receiving quality/strength, a delay evaluation value, etc.

In the aforementioned technical solution, preferably, the relay selection routing apparatus further includes: a parsing unit, used for parsing the failure feature information from the topology discovery response, and judging the time or frequency of updating the database of the topological structure according to the failure feature information.

In the technical solution, when a position change on the terminal side is larger, and when the network side can judge that the position change causes the change of the topological structure, the topological structure can be directly updated, but when the position change on the terminal side is smaller, and when the network side cannot directly judge the change of the topological structure, the time or frequency of updating the database of the topological structure is judged.

In the aforementioned technical solution, preferably, the network establishment unit is specifically used for: releasing a path establishment command according to the data sending path and the destination relay node to establish the data sharing network for the direct communication of the terminal corresponding to the data service sharing request according to the released path establishment command.

In the aforementioned technical solution, preferably, the path establishment command includes an identifier of the destination relay node, time-frequency resources where the direct communication of the terminal is located and an effective time of the data sending path.

In the technical solution, the network side releases the time-frequency resources where the direct communication of the terminal is located and the effective time of the data sending path, so that a relay terminal can successfully establish the data sharing network according to the time-frequency resources and the effective time of the data sending path.

In the aforementioned technical solution, preferably, the preset selection principle includes a minimum hop principle, a maximum throughput principle and/or a minimum delay principle.

In the technical solution, the network side carries out path selection according to the maintained database of the topological structure and relevant link feature information. The network side can carry out the path selection according to the following principles or the combination of multiple principles: the minimum hop principle, the maximum throughput principle and the minimum delay principle, etc.

In the aforementioned technical solution, preferably, the relay selection routing apparatus further includes: an interaction unit, used for sending the database of the topological structure to the database of a superior topological structure of the network side through interfaces between the base stations periodically or in a time triggered manner, and receiving the database of the superior topological structure sent by the database of the superior topological structure of the network side; and if there is no data sending path corresponding to the direct communication service request in a current service area corresponding to the network side, sending a path discovery request to the database of the superior topological structure of the network side, or, if there is no data sending path corresponding to the direct communication service request in the current service area corresponding to the network side, broadcasting the path discovery request to the other base stations, or, sending the database of the topological structure to the other base stations through the interfaces between the base stations periodically or in a time triggered manner, and receiving the databases of the corresponding topological structures sent by the other base stations to realize the synchronization of information of the topological structures.

In the technical solution, when there is no available path of a relevant destination terminal in the current service area, the path discovery request is sent to the database of the superior topological structure of the network side to acquire a cross-regional topological structure; or when there is no available path of the relevant destination terminal in the current service area, the path discovery request is broadcasted to neighbor base stations; or the mastered topological information is mutually synchronized through the interfaces between the base stations periodically or in a time triggered manner, so that the service base station has more comprehensive global topological structure information.

Specifically, after the data sharing network is established, in a data sharing process, if the change of the topological structure is detected and the change influences the path having been selected by the current user, a path update request is sent to transfer to other available paths to carry out data sharing so as to guarantee smooth data sharing. According to the third aspect of the present invention, a relay selection router based on direct communication of a terminal is further provided, applied to a base station, comprising a processor and a memory, wherein by invoking operation instructions stored in the memory, the processor is used for executing the following operations: establishing a database of a topological structure of a direct communication terminal on a network side; when a change of the topological structure is detected, updating the database of the topological structure; when a direct communication service request is received, determining a data sending path and a destination relay node corresponding to the direct communication service request according to the database of the topological structure, sender information and receiver information of the direct communication service request and a preset selection principle; and establishing a direct communication data sharing network corresponding to the direct communication service request according to the data sending path and the destination relay node.

In the technical solution, the database of the topological structure is established on the network side by a topology discovery process, and when the topological structure changes, the database is updated by a topology update process. When service demands triggered by a network or initiated by the terminal arrive, a path selection and relay selection process is carried out according to the existing database, and the establishment of the direct communication data sharing network is completed at last, in this way, massive signaling overheads caused by flooding routing in the existing routing algorithms can be avoided, and unnecessary signaling overheads caused by broadcast in an overlarge range when the topological structure is established can be reduced.

In the aforementioned technical solution, preferably, the establishing a database of a topological structure of a direct communication terminal on a network side specifically includes: sending a topology discovery request to at least one terminal within the coverage of the base station, so that the at least one terminal carries out channel measurement according to the topology discovery request; receiving topology discovery response fed back by the at least one terminal after carrying out the channel measurement; and establishing the database of the topological structure of the direct communication terminal according to the topology discovery response.

In the aforementioned technical solution, preferably, the topology discovery request contains at least one of or a combination of a relevant threshold constraining the topology discovery response, time-frequency domain resources of the channel measurement, a potential channel measurement range and a channel measurement mode.

In the technical solution, the database of the topological structure of the direct communication terminal is established on the network side by the topology discovery process, wherein the topology discovery process can be directly triggered by the network side, that is, the topology discovery request is triggered by a network side (e.g., the base station) event or periodically, the topology discovery request is released to at least one terminal within the jurisdiction, and the topology discovery request has the following features: 1, the topology discovery request contains the relevant threshold constraining the topology discovery response. If the quality of a channel is greater than or equal to a certain threshold M, the channel is marked as a first priority channel; if the quality of the channel is less than the threshold M and is greater than or equal to a threshold N, the channel is marked as a second priority channel; 2, the topology discovery request contains the time-frequency domain resources of the channel measurement, such as the time-frequency domain resources where a channel detection discovery signal is located (including a Discovery sending period or the like) or the time-frequency domain resources where measurement pilot frequency is located (including a pilot frequency period or the like); and 3, the topology discovery request contains the potential channel measurement range, and this step can be implemented by just activating a measured/measurement terminal within a specific range to send the Discovery or special pilot frequency; the base station can confirm an approximate range of the channel measurement according to position information in advance, for example, only carries out the channel measurement on the terminal that is away from a terminal A within a range of F meters; and the channel measurement is only carried out on a part of terminals according to an upper layer strategy. For example, the channel measurement is only carried out on a part of trusty terminals according to a certain data relay node selection limiting rule.

In the aforementioned technical solution, preferably, the establishing a database of a topological structure of a direct communication terminal on a network side specifically includes: setting a topology discovery parameter for at least one terminal within the coverage of the base station, so that the at least one terminal carries out channel measurement according to the topology discovery parameter; receiving topology discovery response fed back by the at least one terminal after carrying out the channel measurement; and establishing the database of the topological structure according to the topology discovery response.

In the aforementioned technical solution, preferably, the topology discovery parameter contains at least one of or a combination of a triggering period of the topology discovery response, time-frequency domain resources of the channel measurement, a triggering condition of the topology discovery response and a channel measurement mode.

In the technical solution, the database of the topological structure of the direct communication terminal is established on the network side by the topology discovery process, wherein the topology discovery process can be triggered by the terminal, and the terminal actively initiates the topology discovery process according to the parameter set by the base station through "topology discovery parameter setting". The topology discovery parameter contains at least one of: 1, the triggering period; 2, preset time-frequency domain resources of the channel measurement, such as the time-frequency domain resources where the channel detection discovery signal is located (including the Discovery sending period or the like) or the time-frequency domain resources where the measurement pilot frequency is located (including the pilot frequency period or the like); and 3, the event triggering condition. For example, the terminal A has data greater than or equal to a threshold E mega to be sent.

In the aforementioned technical solution, preferably, the channel measurement mode includes an active channel measurement mode and a passive channel measurement mode, when the channel measurement mode is the active channel measurement mode, each of the at least one terminal actively sends discovery information, and other terminals surrounding each terminal respectively reply discovery response to the corresponding terminal after receiving the discovery information, so that each terminal carries out channel evaluation according to the discovery response; and when the channel measurement mode is the passive channel measurement mode, each of the at least one terminal passively receives the discovery information sent by the surrounding other terminals, so that each terminal carries out channel evaluation according to the discovery information.

In the technical solution, no matter the topology discovery process is triggered by the terminal or the network side, when the terminal carries out channel detection, the detection thereof has active and passive detection mechanisms. The passive detection mechanism is that a discovery party passively receives the discovery information sent by the surrounding terminals, knows which terminals are nearby after receiving the information and can approximately know the channel quality. The active detection mechanism is that the discovery party actively sends the discovery information, and the surrounding terminals reply the response after receiving the discovery information, to notify the discovery party of their existence surrounding the same.

In the aforementioned technical solution, preferably, the topology discovery response includes node identifier information of a measurement terminal and a measured terminal, which carry out the channel measurement, a time label of the channel measurement, channel feature information and failure feature information.

In the technical solution, the topology discovery response includes, but not limited to, the node identifier information of the measurement terminal and the measured terminal, which carry out the channel measurement, the time label of the channel measurement, the channel feature information and the failure feature information, wherein node identifiers feed back the node identifier information of the measurement terminal and the measured terminal. The time label is time information indicating the completion of the current measurement, and the information can be either absolute time information or relative time information (e.g., increasing serial numbers of maintenance). Failure features are used for representing relevant parameters of the timeliness of the current channel measurement, for example, a moving speed of the terminal and the like, and the network side controls the update frequency of the topological structure maintained by the network side according to the information. The channel feature information is used for representing the state of the channel, and can include pilot frequency receiving quality/ strength, a delay evaluation value, etc.

In the aforementioned technical solution, preferably, the processor is further used for executing the following operations: parsing the failure feature information from the topology discovery response, and judging the time or frequency of updating the database of the topological structure according to the failure feature information.

In the technical solution, when a position change on the terminal side is larger, and when the network side can judge that the position change causes the change of the topological structure, the topological structure can be directly updated, but when the position change on the terminal side is smaller, and when the network side cannot directly judge the change of the topological structure, the time or frequency of updating the database of the topological structure is judged.

In the aforementioned technical solution, preferably, the establishing a data sharing network for direct communication of the terminal corresponding to the data service sharing request according to the data sending path and the destination relay node specifically includes: releasing a path establishment command according to the data sending path and the destination relay node to establish the data sharing network for the direct communication of the terminal corresponding to the data service sharing request according to the released path establishment command.

In the aforementioned technical solution, preferably, the path establishment command includes an identifier of the destination relay node, time-frequency resources where the direct communication of the terminal is located and an effective time of the data sending path.

In the technical solution, the network side releases the time-frequency resources where the direct communication of the terminal is located and the effective time of the data sending path, so that a relay terminal can successfully establish the data sharing network according to the time-frequency resources and the effective time of the data sending path.

In the aforementioned technical solution, preferably, the preset selection principle includes a minimum hop principle, a maximum throughput principle and/or a minimum delay principle.

In the technical solution, the network side carries out path selection according to the maintained database of the topological structure and relevant link feature information. The network side can carry out the path selection according to the following principles or the combination of multiple principles: the minimum hop principle, the maximum throughput principle and the minimum delay principle, etc.

In the aforementioned technical solution, preferably, the processor is further used for executing the following operations: sending the database of the topological structure to the database of a superior topological structure of the network side through interfaces between the base stations periodically or in a time triggered manner, and receiving the database of the superior topological structure sent by the database of the superior topological structure of the network side; and if there is no data sending path corresponding to the direct communication service request in a current service area corresponding to the network side, sending a path discovery request to the database of the superior topological structure of the network side; or, if there is no data sending path corresponding to the direct communication service request in the current service area corresponding to the network side, broadcasting the path discovery request to the other base stations; or, sending the database of the topological structure to the other base stations through the interfaces between the base stations periodically or in a time triggered manner, and receiving the databases of the corresponding topological structures sent by the other base stations to realize the synchronization of information of the topological structures.

In the technical solution, when there is no available path of a relevant destination terminal in the current service area, the path discovery request is sent to the database of the superior topological structure of the network side to acquire a cross-regional topological structure; or when there is no available path of the relevant destination terminal in the current service area, the path discovery request is broadcasted to neighbor base stations; or the mastered topological information is mutually synchronized through the interfaces between the base stations periodically or in a time triggered manner, so that the service base station has more comprehensive global topological structure information.

Specifically, after the data sharing network is established, in a data sharing process, if the change of the topological structure is detected and the change influences the path having been selected by the current user, a path update request is sent to transfer to other available paths to carry out data sharing so as to guarantee smooth data sharing. By means of the above technical solutions, massive signaling overheads caused by flooding routing in the existing routing algorithms can be avoided, unnecessary signaling overheads caused by broadcast in an overlarge range when the topological structure is established can be reduced, and the timeliness of the database of the topological structure can be improved.

DETAILED DESCRIPTION OF THE EMBODIMENTS

In order that the aforementioned purposes, features and advantages of the present invention can be understood more clearly, a further detailed description of the present invention will be given below in combination with accompanying drawings and specific implementations. It should be noted that embodiments in the present application and the features in the embodiments can be combined with each other as long as no conflict is generated.

A lot of specific details are described in the description below to fully understand the present invention, but the present invention can also be implemented in other manners different from what is described herein, therefore the protection scope of the present invention is not limited to the specific embodiments disclosed below.

Figure 1:
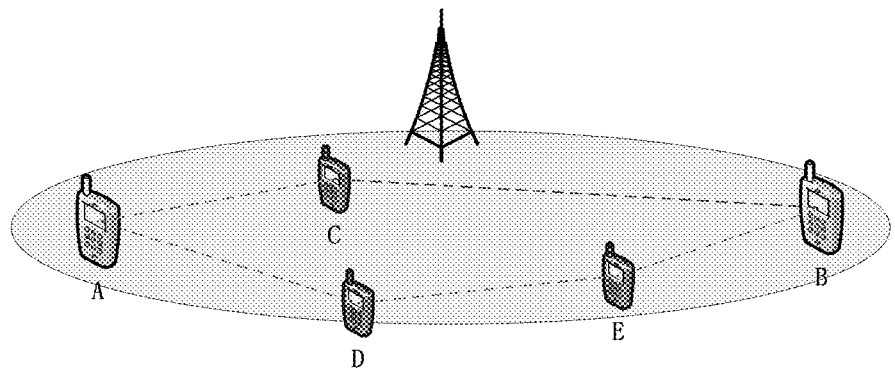
FIG. 1 shows a schematic diagram of a topological structure of a data sharing network for direct communication of a terminal in relevant technology.
Figure 2:
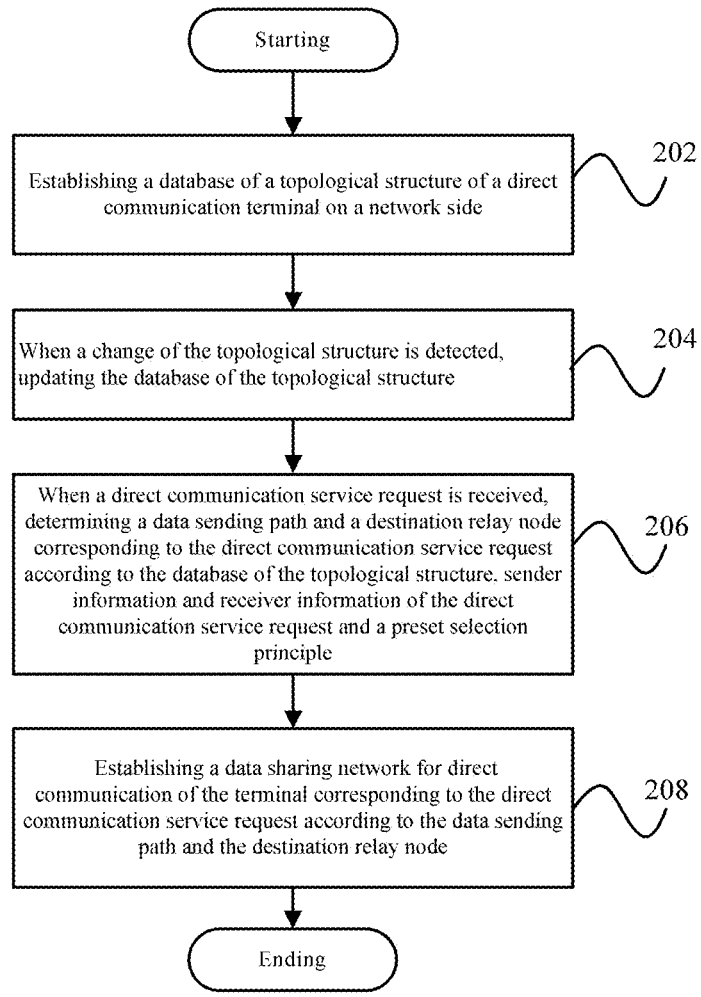
FIG. 2 shows a flowchart of a relay selection routing method according to an embodiment of the present invention.

FIG. 2 shows a flowchart of a relay selection routing method according to an embodiment of the present invention.

As shown in FIG. 2, the relay selection routing method according to the embodiment of the present invention includes: step 202, establishing a database of a topological structure of a direct communication terminal on a network side; step 204, when a change of the topological structure is detected, updating the database of the topological structure; step 206, when a direct communication service request is received, determining a data sending path and a destination relay node corresponding to the direct communication service request according to the database of the topological structure, sender information and receiver information of the direct communication service request and a preset selection principle; and step 208, establishing a direct communication data sharing network corresponding to the direct communication service request according to the data sending path and the destination relay node.

In the technical solution, the database of the topological structure is established on the network side by a topology discovery process, and when the topological structure changes, the database is updated by a topology update process. When service demands triggered by a network or initiated by the terminal arrive, a path selection and relay selection process is carried out according to the existing database, and the establishment of the direct communication data sharing network is completed at last, in this way, massive signaling overheads caused by flooding routing in the existing routing algorithms can be avoided, and unnecessary signaling overheads caused by broadcast in an over-large range when the topological structure is established can be reduced.

In the aforementioned technical solution, preferably, step 202 specifically includes: sending a topology discovery request to at least one terminal within the coverage of the base station, so that the at least one terminal carries out channel measurement according to the topology discovery request; receiving topology discovery response fed back by the at least one terminal after carrying out the channel measurement; and establishing the database of the topological structure of the direct communication terminal according to the topology discovery response.

In the aforementioned technical solution, preferably, the topology discovery request contains at least one of or a combination of a relevant threshold constraining the topology discovery response, time-frequency domain resources of the channel measurement, a potential channel measurement range and a channel measurement mode.

In the technical solution, the database of the topological structure of the direct communication terminal is established on the network side by the topology discovery process, wherein the topology discovery process can be directly triggered by the network side, that is, the topology discovery request is triggered by a network side (e.g., the base station) event or periodically, the topology discovery request is released to at least one terminal within the jurisdiction, and the topology discovery request has the following features: 1, the topology discovery request contains the relevant threshold constraining the topology discovery response. If the quality of a channel is greater than or equal to a certain threshold M, the channel is marked as a first priority channel; if the quality of the channel is less than the threshold M and is greater than or equal to a threshold N, the channel is marked as a second priority channel; 2, the topology discovery request contains the time-frequency domain resources of the channel measurement, such as the time-frequency domain resources where a channel detection discovery signal is located (including a Discovery sending period or the like) or the time-frequency domain resources where measurement pilot frequency is located (including a pilot frequency period or the like); and 3, the topology discovery request contains the potential channel measurement range, and this step can be implemented by just activating a measured/measurement terminal within a specific range to send the Discovery or special pilot frequency; the base station can confirm an approximate range of the channel measurement according to position information in advance, for example, only carries out the channel measurement on the terminal that is away from a terminal A within a range of F meters; and the channel measurement is only carried out on a part of terminals according to an upper layer strategy. For example, the channel measurement is only carried out on a part of trusty terminals according to a certain data relay node selection limiting rule.

In the aforementioned technical solution, preferably, step 202 specifically includes: setting a topology discovery parameter for at least one terminal within the coverage of the base station, so that the at least one terminal carries out channel measurement according to the topology discovery parameter; receiving topology discovery response fed back by the at least one terminal after carrying out the channel measurement; and establishing the database of the topological structure according to the topology discovery response.

In the aforementioned technical solution, preferably, the topology discovery parameter contains at least one of or a combination of a triggering period of the topology discovery response, time-frequency domain resources of the channel measurement, a triggering condition of the topology discovery response and a channel measurement mode.

In the technical solution, the database of the topological structure of the direct communication terminal is established on the network side by the topology discovery process, wherein the topology discovery process can be triggered by the terminal, and the terminal actively initiates the topology discovery process according to the parameter set by the base station through "topology discovery parameter setting". The topology discovery parameter contains at least one of: 1, the triggering period; 2, preset time-frequency domain resources of the channel measurement, such as the time-frequency domain resources where the channel detection discovery signal is located (including the Discovery sending period or the like) or the time-frequency domain resources where the measurement pilot frequency is located (including the pilot frequency period or the like); and 3, the event triggering condition. For example, the terminal A has data greater than or equal to a threshold E mega to be sent.

In the aforementioned technical solution, preferably, the channel measurement mode includes an active channel measurement mode and a passive channel measurement mode, when the channel measurement mode is the active channel measurement mode, each of the at least one terminal actively sends discovery information, and other terminals surrounding each terminal respectively reply discovery response to the corresponding terminal after receiving the discovery information, so that each terminal carries out channel evaluation according to the discovery response; and when the channel measurement mode is the passive channel measurement mode, each of the at least one terminal passively receives the discovery information sent by the surrounding other terminals, so that each terminal carries out channel evaluation according to the discovery information.

In the technical solution, no matter the topology discovery process is triggered by the terminal or the network side, when the terminal carries out channel detection, the detection thereof has active and passive detection mechanisms. The passive detection mechanism is that a discovery party passively receives the discovery information sent by the surrounding terminals, knows which terminals are nearby after receiving the information and can approximately know the channel quality. The active detection mechanism is that the discovery party actively sends the discovery information, and the surrounding terminals reply the response after receiving the discovery information, to notify the discovery party of their existence surrounding the same.

In the aforementioned technical solution, preferably, the topology discovery response includes node identifier information of a measurement terminal and a measured terminal, which carry out the channel measurement, a time label of the channel measurement, channel feature information and failure feature information.

In the technical solution, the topology discovery response includes, but not limited to, the node identifier information of the measurement terminal and the measured terminal, which carry out the channel measurement, the time label of the channel measurement, the channel feature information and the failure feature information, wherein node identifiers feed back the node identifier information of the measurement terminal and the measured terminal. The time label is time information indicating the completion of the current measurement, and the information can be either absolute time information or relative time information (e.g., increasing serial numbers of maintenance). Failure features are used for representing relevant parameters of the timeliness of the current channel measurement, for example, a moving speed of the terminal and the like, and the network side controls the update frequency of the topological structure maintained by the network side according to the information. The channel feature information is used for representing the state of the channel, and can include pilot frequency receiving quality/strength, a delay evaluation value, etc.

In the aforementioned technical solution, preferably, the relay selection routing method further includes: parsing the failure feature information from the topology discovery response, and judging the time or frequency of updating the database of the topological structure according to the failure feature information.

In the technical solution, when a position change on the terminal side is larger, and when the network side can judge that the position change causes the change of the topological structure, the topological structure can be directly updated, but when the position change on the terminal side is smaller, and when the network side cannot directly judge the change of the topological structure, the time or frequency of updating the database of the topological structure is judged.

In the aforementioned technical solution, preferably, step 208 specifically includes: releasing a path establishment command according to the data sending path and the destination relay node to establish the data sharing network for the direct communication of the terminal corresponding to the data service sharing request according to the released path establishment command.

In the aforementioned technical solution, preferably, the path establishment command includes an identifier of the destination relay node, time-frequency resources where the direct communication of the terminal is located and an effective time of the data sending path.

In the technical solution, the network side releases the time-frequency resources where the direct communication of the terminal is located and the effective time of the data sending path, so that a relay terminal can successfully establish the data sharing network according to the time-frequency resources and the effective time of the data sending path.

In the aforementioned technical solution, preferably, the preset selection principle includes a minimum hop principle, a maximum throughput principle and/or a minimum delay principle.

In the technical solution, the network side carries out path selection according to the maintained database of the topological structure and relevant link feature information. The network side can carry out the path selection according to the following principles or the combination of multiple principles: the minimum hop principle, the maximum throughput principle and the minimum delay principle, etc.

In the aforementioned technical solution, preferably, the relay selection routing method further includes: sending the database of the topological structure to the database of a superior topological structure of the network side through interfaces between the base stations periodically or in a time triggered manner, and receiving the database of the superior topological structure sent by the database of the superior topological structure of the network side; and if there is no data sending path corresponding to the direct communication service request in a current service area corresponding to the network side, sending a path discovery request to the database of the superior topological structure of the network side; or, if there is no data sending path corresponding to the direct communication service request in the current service area corresponding to the network side, broadcasting the path discovery request to the other base stations; or, sending the database of the topological structure to the other base stations through the interfaces between the base stations periodically or in a time triggered manner, and receiving the databases of the corresponding topological structures sent by the other base stations to realize the synchronization of information of the topological structures.

In the technical solution, when there is no available path of a relevant destination terminal in the current service area, the path discovery request is sent to the database of the superior topological structure of the network side to acquire a cross-regional topological structure; or when there is no available path of the relevant destination terminal in the current service area, the path discovery request is broadcasted to neighbor base stations; or the mastered topological information is mutually synchronized through the interfaces between the base stations periodically or in a time triggered manner, so that the service base station has more comprehensive global topological structure information.

Figure 3:
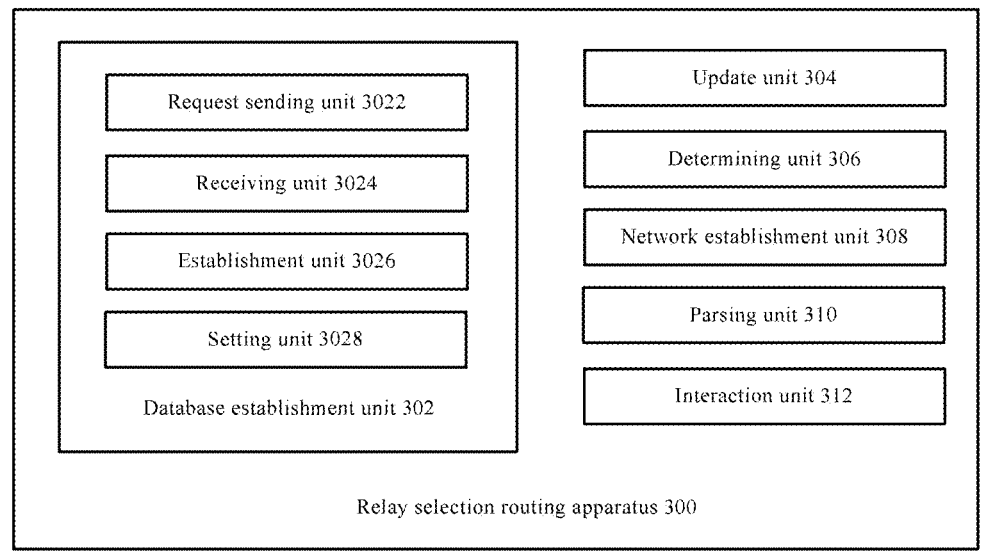
FIG. 3 shows a block diagram of a relay selection routing apparatus according to an embodiment of the present invention.

Specifically, after the data sharing network is established, in a data sharing process, if the change of the topological structure is detected and the change influences the path having been selected by the current user, a path update request is sent to transfer to other available paths to carry out data sharing so as to guarantee smooth data sharing. FIG. 3 shows a block diagram of a relay selection routing apparatus according to an embodiment of the present invention.

As shown in FIG. 3, the relay selection routing apparatus 300 according to the embodiment of the present invention includes: a database establishment unit 302, used for establishing a database of a topological structure of a direct communication terminal on a network side; an update unit 304 used for, when a change of the topological structure is detected, updating the database of the topological structure; a determining unit 306 used for, when a direct communication service request is received, determining a data sending path and a destination relay node corresponding to the direct communication service request according to the database of the topological structure, sender information and receiver information of the direct communication service request and a preset selection principle; and a network establishment unit 308, used for establishing a direct communication data sharing network corresponding to the direct communication service request according to the data sending path and the destination relay node.

In the technical solution, the database of the topological structure is established on the network side by a topology discovery process, and when the topological structure changes, the database is updated by a topology update process. When service demands triggered by a network or initiated by the terminal arrive, a path selection and relay selection process is carried out according to the existing database, and the establishment of the direct communication data sharing network is completed at last, in this way, massive signaling overheads caused by flooding routing in the existing routing algorithms can be avoided, and unnecessary signaling overheads caused by broadcast in an over-large range when the topological structure is established can be reduced.

In the aforementioned technical solution, preferably, the database establishment unit 302 includes: a request sending unit 3022, used for sending a topology discovery request to at least one terminal within the coverage of the base station, so that the at least one terminal carries out channel measurement according to the topology discovery request; a receiving unit 3024, used for receiving topology discovery response fed back by the at least one terminal after carrying out the channel measurement; and an establishment unit 3026, used for establishing the database of the topological structure according to the topology discovery response.

In the aforementioned technical solution, preferably, the topology discovery request contains at least one of or a combination of a relevant threshold constraining the topology discovery response, time-frequency domain resources of the channel measurement, a potential channel measurement range and a channel measurement mode.

In the technical solution, the database of the topological structure of the direct communication terminal is established on the network side by the topology discovery process, wherein the topology discovery process can be directly triggered by the network side, that is, the topology discovery request is triggered by a network side (e.g., the base station) event or periodically, the topology discovery request is released to at least one terminal within the jurisdiction, and the topology discovery request has the following features: 1, the topology discovery request contains the relevant threshold constraining the topology discovery response. If the quality of a channel is greater than or equal to a certain threshold M, the channel is marked as a first priority channel; if the quality of the channel is less than the threshold M and is greater than or equal to a threshold N, the channel is marked as a second priority channel; 2, the topology discovery request contains the time-frequency domain resources of the channel measurement, such as the time-frequency domain resources where a channel detection discovery signal is located (including a Discovery sending period or the like) or the time-frequency domain resources where measurement pilot frequency is located (including a pilot frequency period or the like); and 3, the topology discovery request contains the potential channel measurement range, and this step can be implemented by just activating a measured/measurement terminal within a specific range to send the Discovery or special pilot frequency; the base station can confirm an approximate range of the channel measurement according to position information in advance, for example, only carries out the channel measurement on the terminal that is away from a terminal A within a range of F meters; and the channel measurement is only carried out on a part of terminals according to an upper layer strategy. For example, the channel measurement is only carried out on a part of trusty terminals according to a certain data relay node selection limiting rule.

In the aforementioned technical solution, preferably, the database establishment unit 302 includes: a setting unit 3028, used for setting a topology discovery parameter for at least one terminal within the coverage of the base station, so that the at least one terminal carries out channel measurement according to the topology discovery parameter; a receiving unit 3024, used for receiving topology discovery response fed back by the at least one terminal after carrying out the channel measurement; and an establishment unit 3026, used for establishing the database of the topological structure according to the topology discovery response.

In the aforementioned technical solution, preferably, the topology discovery parameter contains at least one of or a combination of a triggering period of the topology discovery response, time-frequency domain resources of the channel measurement, a triggering condition of the topology discovery response and a channel measurement mode.

In the technical solution, the database of the topological structure of the direct communication terminal is established on the network side by the topology discovery process, wherein the topology discovery process can be triggered by the terminal, and the terminal actively initiates the topology discovery process according to the parameter set by the base station through "topology discovery parameter setting". The topology discovery parameter contains at least one of: 1, the triggering period; 2, preset time-frequency domain resources of the channel measurement, such as the time-frequency domain resources where the channel detection discovery signal is located (including the Discovery sending period or the like) or the time-frequency domain resources where the measurement pilot frequency is located (including the pilot frequency period or the like); and 3, the event triggering condition. For example, the terminal A has data greater than or equal to a threshold E mega to be sent.

In the aforementioned technical solution, preferably, the channel measurement mode includes an active channel measurement mode and a passive channel measurement mode, when the channel measurement mode is the active channel measurement mode, each of the at least one terminal actively sends discovery information, and other terminals surrounding each terminal respectively reply discovery response to the corresponding terminal after receiving the discovery information, so that each terminal carries out channel evaluation according to the discovery response; and when the channel measurement mode is the passive channel measurement mode, each of the at least one terminal passively receives the discovery information sent by the surrounding other terminals, so that each terminal carries out channel evaluation according to the discovery information.

In the technical solution, no matter the topology discovery process is triggered by the terminal or the network side, when the terminal carries out channel detection, the detection thereof has active and passive detection mechanisms. The passive detection mechanism is that a discovery party passively receives the discovery information sent by the surrounding terminals, knows which terminals are nearby after receiving the information and can approximately know the channel quality. The active detection mechanism is that the discovery party actively sends the discovery information, and the surrounding terminals reply the response after receiving the discovery information, to notify the discovery party of their existence surrounding the same.

In the aforementioned technical solution, preferably, the topology discovery response includes node identifier information of a measurement terminal and a measured terminal, which carry out the channel measurement, a time label of the channel measurement, channel feature information and failure feature information.

In the technical solution, the topology discovery response includes, but not limited to, the node identifier information of the measurement terminal and the measured terminal, which carry out the channel measurement, the time label of the channel measurement, the channel feature information and the failure feature information, wherein node identifiers feed back the node identifier information of the measurement terminal and the measured terminal. The time label is time information indicating the completion of the current measurement, and the information can be either absolute time information or relative time information (e.g., increasing serial numbers of maintenance). Failure features are used for representing relevant parameters of the timeliness of the current channel measurement, for example, a moving speed of the terminal and the like, and the network side controls the update frequency of the topological structure maintained by the network side according to the information. The channel feature information is used for representing the state of the channel, and can include pilot frequency receiving quality/strength, a delay evaluation value, etc.

In the aforementioned technical solution, preferably, the relay selection routing apparatus further includes: a parsing unit 310, used for parsing the failure feature information from the topology discovery response, and judging the time or frequency of updating the database of the topological structure according to the failure feature information.

In the technical solution, when a position change on the terminal side is larger, and when the network side can judge that the position change causes the change of the topological structure, the topological structure can be directly updated, but when the position change on the terminal side is smaller, and when the network side cannot directly judge the change of the topological structure, the time or frequency of updating the database of the topological structure is judged.

In the aforementioned technical solution, preferably, the network establishment unit 308 is specifically used for: releasing a path establishment command according to the data sending path and the destination relay node to establish the data sharing network for the direct communication of the terminal corresponding to the data service sharing request according to the released path establishment command.

In the aforementioned technical solution, preferably, the path establishment command includes an identifier of the destination relay node, time-frequency resources where the direct communication of the terminal is located and an effective time of the data sending path.

In the technical solution, the network side releases the time-frequency resources where the direct communication of the terminal is located and the effective time of the data sending path, so that a relay terminal can successfully establish the data sharing network according to the time-frequency resources and the effective time of the data sending path.

In the aforementioned technical solution, preferably, the preset selection principle includes a minimum hop principle, a maximum throughput principle and/or a minimum delay principle.

In the technical solution, the network side carries out path selection according to the maintained database of the topological structure and relevant link feature information. The network side can carry out the path selection according to the following principles or the combination of multiple principles: the minimum hop principle, the maximum throughput principle and the minimum delay principle, etc.

In the aforementioned technical solution, preferably, the relay selection routing apparatus further includes: an interaction unit 312, used for sending the database of the topological structure to the database of a superior topological structure of the network side through interfaces between the base stations periodically or in a time triggered manner, and receiving the database of the superior topological structure sent by the database of the superior topological structure of the network side; and if there is no data sending path corresponding to the direct communication service request in a current service area corresponding to the network side, sending a path discovery request to the database of the superior topological structure of the network side, or, if there is no data sending path corresponding to the direct communication service request in the current service area corresponding to the network side, broadcasting the path discovery request to the other base stations, or, sending the database of the topological structure to the other base stations through the interfaces between the base stations periodically or in a time triggered manner, and receiving the databases of the corresponding topological structures sent by the other base stations to realize the synchronization of information of the topological structures.

In the technical solution, when there is no available path of a relevant destination terminal in the current service area, the path discovery request is sent to the database of the superior topological structure of the network side to acquire a cross-regional topological structure; or when there is no available path of the relevant destination terminal in the current service area, the path discovery request is broadcasted to neighbor base stations; or the mastered topological information is mutually synchronized through the interfaces between the base stations periodically or in a time triggered manner, so that the service base station has more comprehensive global topological structure information.

Specifically, after the data sharing network is established, in a data sharing process, if the change of the topological structure is detected and the change influences the path having been selected by the current user, a path update request is sent to transfer to other available paths to carry out data sharing so as to guarantee smooth data sharing. The technical solutions of the present invention will be illustrated below in detail in combination with FIG. 4 to FIG. 9.

Figure 4:
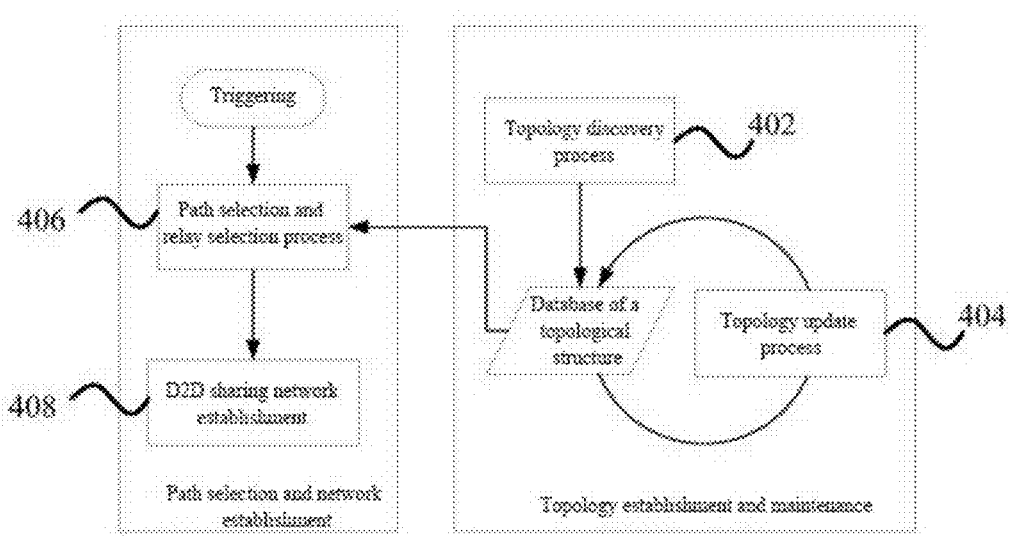
FIG. 4 shows a specific flowchart of a relay selection routing method according to an embodiment of the present invention.

As shown in FIG. 4, in the present invention, the database of the topological structure is established on the network side by a topology discovery process 402, and when the topological structure changes, the database is updated by a topology update process 404. When service demands triggered by a network or initiated by the terminal arrive, a path selection and relay selection process 406 is carried out according to the existing database, and the establishment 408 of the direct communication data sharing network is completed at last. The specific steps are as follows:

The topology discovery process 402:

In order to find an appropriate relay node and an appropriate path in the direct communication network, the "topology discovery process" is defined in the present invention. According to different triggers, the triggering can be divided into "UE (terminal) triggering" and "network triggering". The detailed steps are listed as follows:

I. Triggering of the Topology Discovery Process

1. Network Triggering

Figure 5:
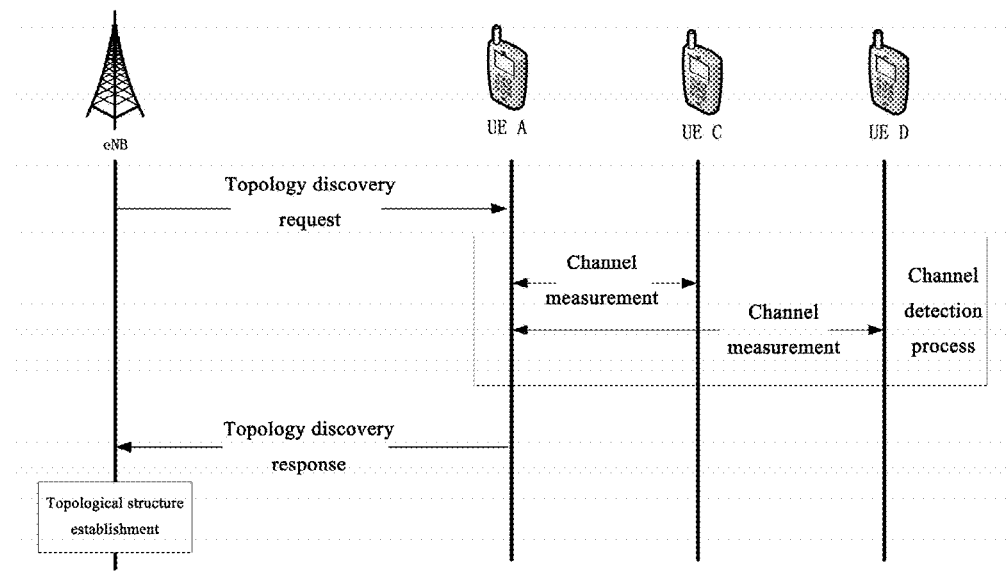
FIG. 5 shows a schematic diagram of a topology discovery process triggered by a network side according to an embodiment of the present invention.
Figure 6:
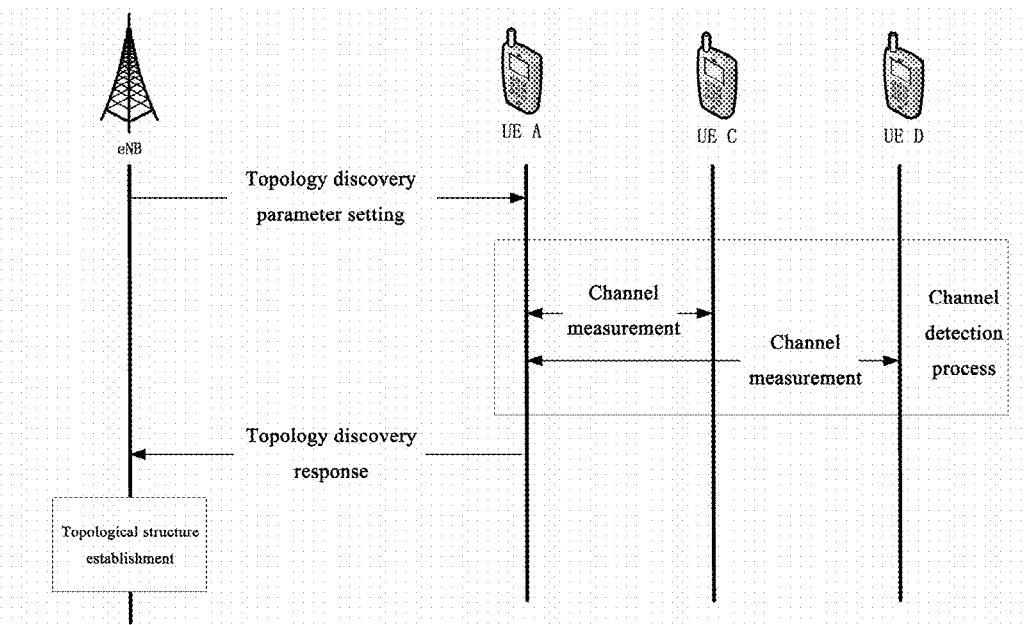
FIG. 6 shows a schematic diagram of a topology discovery process triggered by a terminal side according to an embodiment of the present invention.

As shown in FIG. 5, a topology discovery request is triggered by a network side (e.g., the base station) event or periodically, the signaling is released to at least one UE within the jurisdiction, and the signaling has the following features:

(1) the signaling contains a relevant threshold constraining topology discovery response. If the quality of a channel is greater than or equal to a certain threshold M, the channel is marked as a first priority channel; if the quality of the channel is less than the threshold M and is greater than or equal to a threshold N, the channel is marked as a second priority channel;

(2) the signaling contains time-frequency domain resources of channel measurement, such as the time-frequency domain resources where a channel detection discovery signal is located (including a Discovery sending period or the like) or the time-frequency domain resources where measurement pilot frequency is located (including a pilot frequency period or the like); and (3) the signaling contains the potential channel measurement range. The step can be implemented by just activating measured/measurement UEs within a specific range to send the Discovery or special pilot frequency;

(a) the base station can confirm an approximate range of the channel measurement according to position information in advance, for example, only carries out the channel measurement on the UEs that are away from a terminal A within a range of F meters;

(b) the channel measurement is only carried out on a part of terminals according to an upper layer strategy. For example, the channel measurement is only carried out on a part of trusty UEs according to a certain data relay node selection limiting rule;

2. UE Triggering:

as shown in FIG. 6, a UE actively initiates the topology discovery process according to the parameter set by the base station through "topology discovery parameter setting". The topology discovery parameter contains at least one of the following items:

(1) a triggering period (2) preset time-frequency domain resources of the channel measurement, such as the time-frequency domain resources where the channel detection discovery signal is located (including the Discovery sending period or the like) or the time-frequency domain resources where the measurement pilot frequency is located (including the pilot frequency period or the like); and (3) an event triggering condition. For example, UE A has data greater than or equal to a threshold E mega to be sent.

II. A measurement UE and a measured UE carry out a channel measurement process. The measurement UE completes the channel measurement of at least one measured UE and receives channel state feedback information from the measured UE.

III. Topology discovery response. The measurement UE feeds back a "topology discovery response" message to the network side. The message contains the following features:

1. node identifiers: feeding back the node identifier information of the measurement UE and the measured UE.

2. Time label: time information indicating the completion of the current measurement. The information can be either absolute time information or relative time information (e.g., increasing serial numbers of maintenance).

3. Failure features: used for representing relevant parameters of the timeliness of the current channel measurement, for example, a moving speed of the UE and the like. The network side controls the update frequency of the topological structure maintained by the network side according to the information.

4. Channel feature information: used for representing the state of the channel. It can include pilot frequency receiving quality/strength, a delay evaluation value, etc.

IV. Establishment of the database of the topological structure. The network side maintains the database of the topological structure according to the "topology discovery response" message reported by the UE:

1. The network side compares the time label of a corresponding link in the database according to the time label fed back in certain measurement and retains the data of the latest version for path and node selection.

Figure 7:
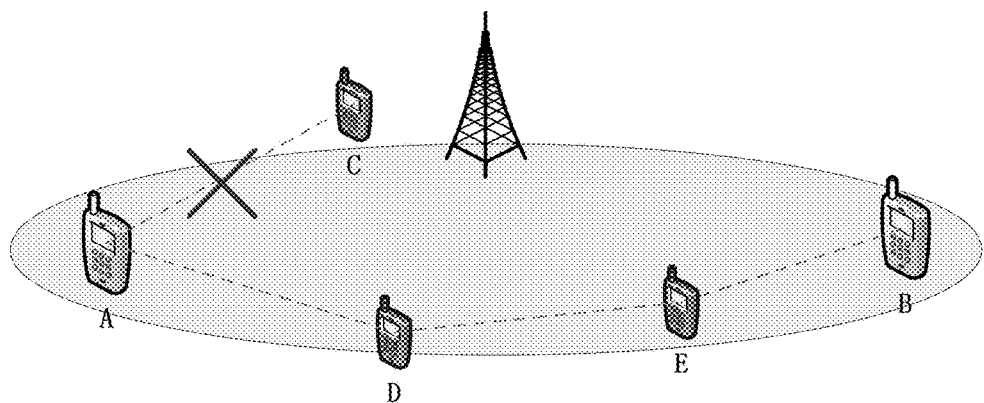
FIG. 7 shows a schematic diagram when a topological structure according to an embodiment of the present invention changes.

2. The network side initiates the "topology maintenance process 404" according to the failure feature information of a certain link fed back by the measurement. The topology maintenance process 404:

To deal with the failure of an existing path resulting from the change of the topological structure (e.g., position change of the UE), as shown in FIG. 7, the "topology maintenance process 404" is defined in the present invention.

When the network side needs to update the network topology according to the "failure features", or when the topological structure changes due to the movement of the UE, but the network side does not initiate the "topology maintenance process 404", the network side or the UE triggers the topology maintenance process 404.

Figure 8:
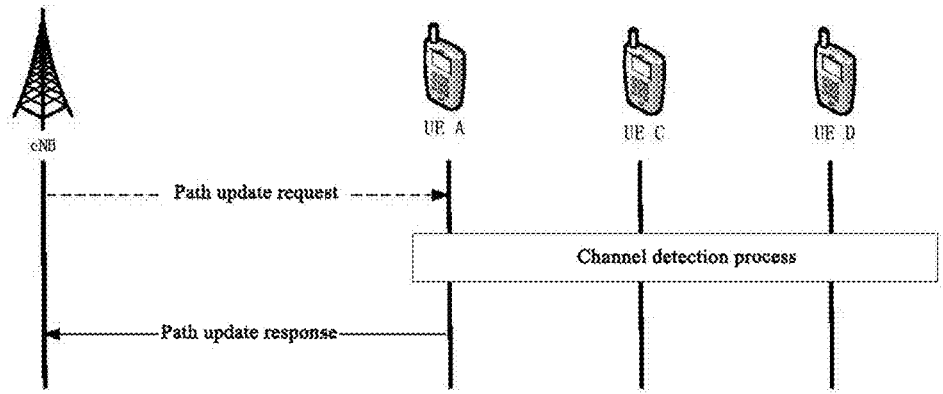
FIG. 8 shows a schematic diagram of a topology maintenance flow according to an embodiment of the present invention changes.

As shown in FIG. 8, according to the failure features, the network side can trigger a path update request to indicate the UE to carry out a channel detection process. The UE triggers a path update response message actively or according to network indication information.

Figure 9:
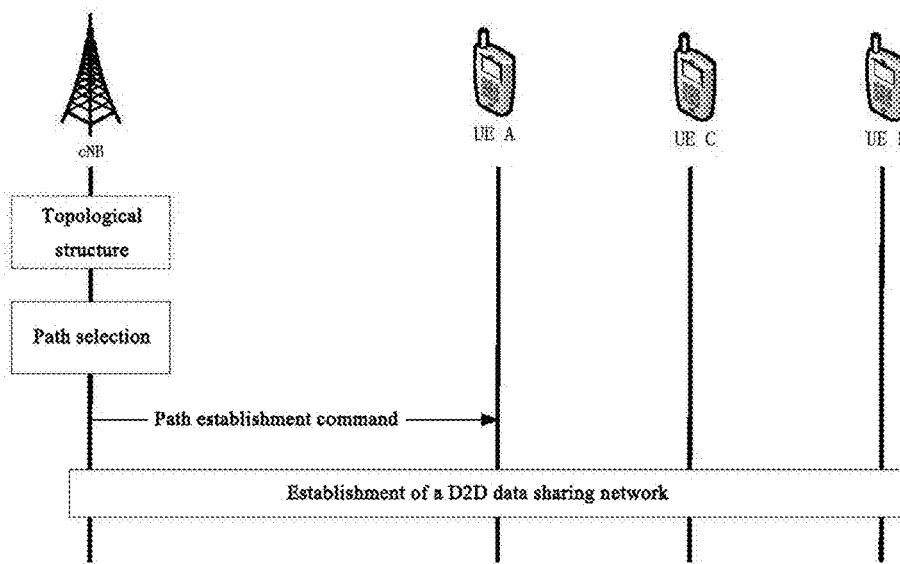
FIG. 9 shows a schematic diagram of a path establishment and relay selection process according to an embodiment of the present invention.

Path establishment and relay selection process 406:

As shown in FIG. 9, when the UE initiates data service sharing, the base station triggers a path establishment process based on the network topological structure maintained by the network side. The specific steps are as follows:

1. Path selection is carried out according to the existing database of the topological structure.

2. Path selection: the network side carries out the path selection according to the maintained database of the topological structure and relevant link feature information. The network side can carry out the path selection according to the following principles or the combination of multiple principles:

(1) a minimum hop principle;
(2) a maximum throughput principle; and
(3) a minimum delay principle.

3. The network side releases a path establishment command. The command contains the following information:

(1) the selected data relay node identifier
(2) the time-frequency resources where D2D communication is located 4. A D2D data sharing network is established. The network is established according to the existing D2D communication physical layer establishment process.

In addition, in order that the service base station has more comprehensive global topological structure information, the base station can also carry out information interaction of the topological structure with other base stations.

Figure 10:
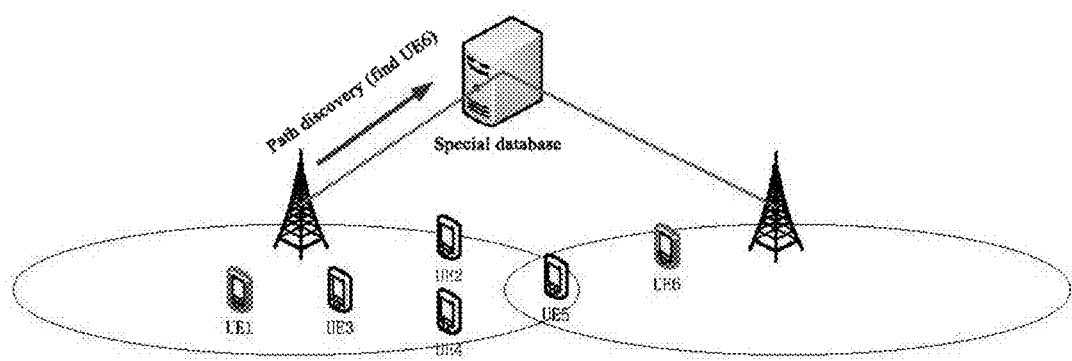
FIG. 10 to FIG. 12 show schematic diagrams of information interaction of a topological structure according to an embodiment of the present invention.

As shown in FIG. 10, when there is no available path of relevant destination UEs in the current service area, the path discovery request can be sent to the database of a superior topological structure of the network side to acquire a cross-regional topological structure.

Specifically, the base station can send the database of the topological structure to the database of the superior topological structure of the network side through interfaces between the base stations periodically or in a time triggered manner, and receive the database of the superior topological structure of the network side sent by the database of the superior topological structure of the network side.

Figure 11:
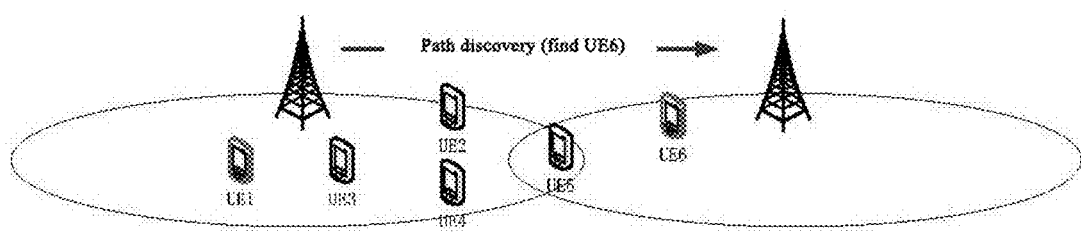

As shown in FIG. 11, when there is no available path of the relevant destination UEs in the current service area, the path discovery request can also be broadcasted to neighbor base stations.

Figure 12:
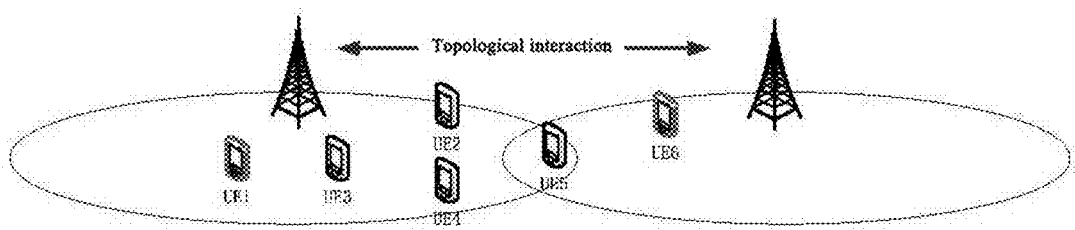

As shown in FIG. 12, the base stations can also mutually synchronize the mastered topological information through the interfaces between the base stations periodically or in a time triggered manner, so that the service base station has more comprehensive global topological structure information.

Figure 13:
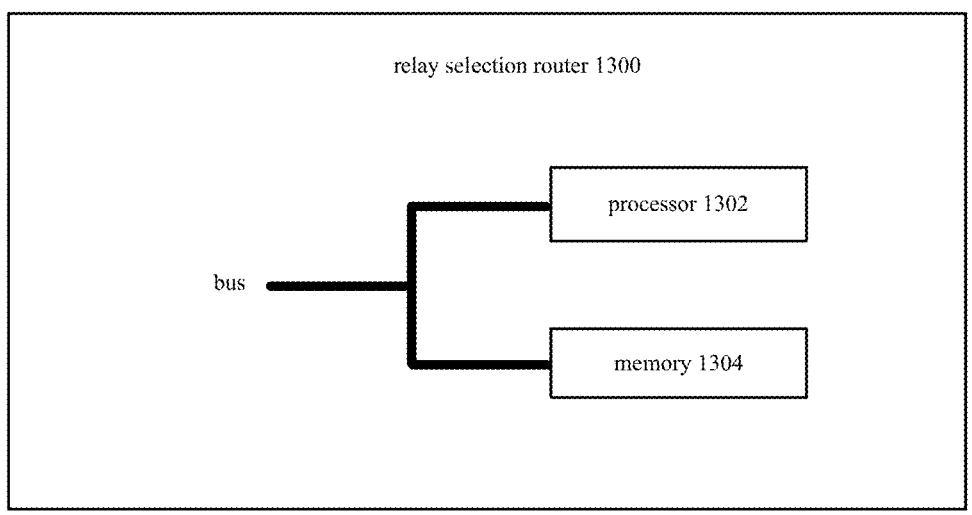
FIG. 13 shows a block diagram of a relay selection router according to an embodiment of the present invention.

FIG. 13 shows a block diagram of the relay selection router 1300 based on direct communication of a terminal according to the third aspect of the present invention.

As shown in FIG. 13, the relay selection router 1300 based on direct communication of a terminal according to the third aspect of the present invention comprises a processor 1302 (wherein one or more processors can be arranged in the router 1300, and one processor 1302 is taken as an example in FIG. 13) and a memory 1304. In some embodiments of the present invention, the processor 1302 and the memory 1304 can be connected by buses or in other manners, and bus connection is taken as an example in FIG. 13.

Wherein by invoking operation instructions stored in the memory 1304, the processor 1302 is used for executing the following operations: establishing a database of a topological structure of a direct communication terminal on a network side; when a change of the topological structure is detected, updating the database of the topological structure; when a direct communication service request is received, determining a data sending path and a destination relay node corresponding to the direct communication service request according to the database of the topological structure, sender information and receiver information of the direct communication service request and a preset selection principle; and establishing a direct communication data sharing network corresponding to the direct communication service request according to the data sending path and the destination relay node.

In the technical solution, the database of the topological structure is established on the network side by a topology discovery process, and when the topological structure changes, the database is updated by a topology update process. When service demands triggered by a network or initiated by the terminal arrive, a path selection and relay selection process is carried out according to the existing database, and the establishment of the direct communication data sharing network is completed at last, in this way, massive signaling overheads caused by flooding routing in the existing routing algorithms can be avoided, and unnecessary signaling overheads caused by broadcast in an over-large range when the topological structure is established can be reduced.

In the aforementioned technical solution, preferably, the establishing a database of a topological structure of a direct communication terminal on a network side specifically includes: sending a topology discovery request to at least one terminal within the coverage of the base station, so that the at least one terminal carries out channel measurement according to the topology discovery request; receiving topology discovery response fed back by the at least one terminal after carrying out the channel measurement; and establishing the database of the topological structure of the direct communication terminal according to the topology discovery response.

In the aforementioned technical solution, preferably, the topology discovery request contains at least one of or a combination of a relevant threshold constraining the topology discovery response, time-frequency domain resources of the channel measurement, a potential channel measurement range and a channel measurement mode.

In the technical solution, the database of the topological structure of the direct communication terminal is established on the network side by the topology discovery process, wherein the topology discovery process can be directly triggered by the network side, that is, the topology discovery request is triggered by a network side (e.g., the base station) event or periodically, the topology discovery request is released to at least one terminal within the jurisdiction, and the topology discovery request has the following features: 1, the topology discovery request contains the relevant threshold constraining the topology discovery response. If the quality of a channel is greater than or equal to a certain threshold M, the channel is marked as a first priority channel; if the quality of the channel is less than the threshold M and is greater than or equal to a threshold N, the channel is marked as a second priority channel; 2, the topology discovery request contains the time-frequency domain resources of the channel measurement, such as the time-frequency domain resources where a channel detection discovery signal is located (including a Discovery sending period or the like) or the time-frequency domain resources where measurement pilot frequency is located (including a pilot frequency period or the like); and 3, the topology discovery request contains the potential channel measurement range, and this step can be implemented by just activating a measured/measurement terminal within a specific range to send the Discovery or special pilot frequency; the base station can confirm an approximate range of the channel measurement according to position information in advance, for example, only carries out the channel measurement on the terminal that is away from a terminal A within a range of F meters; and the channel measurement is only carried out on a part of terminals according to an upper layer strategy. For example, the channel measurement is only carried out on a part of trusty terminals according to a certain data relay node selection limiting rule.

In the aforementioned technical solution, preferably, the establishing a database of a topological structure of a direct communication terminal on a network side specifically includes: setting a topology discovery parameter for at least one terminal within the coverage of the base station, so that the at least one terminal carries out channel measurement according to the topology discovery parameter; receiving topology discovery response fed back by the at least one terminal after carrying out the channel measurement; and establishing the database of the topological structure according to the topology discovery response.

In the aforementioned technical solution, preferably, the topology discovery parameter contains at least one of or a combination of a triggering period of the topology discovery response, time-frequency domain resources of the channel measurement, a triggering condition of the topology discovery response and a channel measurement mode.

In the technical solution, the database of the topological structure of the direct communication terminal is established on the network side by the topology discovery process, wherein the topology discovery process can be triggered by the terminal, and the terminal actively initiates the topology discovery process according to the parameter set by the base station through "topology discovery parameter setting". The topology discovery parameter contains at least one of: 1, the triggering period; 2, preset time-frequency domain resources of the channel measurement, such as the time-frequency domain resources where the channel detection discovery signal is located (including the Discovery sending period or the like) or the time-frequency domain resources where the measurement pilot frequency is located (including the pilot frequency period or the like); and 3, the event triggering condition. For example, the terminal A has data greater than or equal to a threshold E mega to be sent.

In the aforementioned technical solution, preferably, the channel measurement mode includes an active channel measurement mode and a passive channel measurement mode, when the channel measurement mode is the active channel measurement mode, each of the at least one terminal actively sends discovery information, and other terminals surrounding each terminal respectively reply discovery response to the corresponding terminal after receiving the discovery information, so that each terminal carries out channel evaluation according to the discovery response; and when the channel measurement mode is the passive channel measurement mode, each of the at least one terminal passively receives the discovery information sent by the surrounding other terminals, so that each terminal carries out channel evaluation according to the discovery information.

In the technical solution, no matter the topology discovery process is triggered by the terminal or the network side, when the terminal carries out channel detection, the detection thereof has active and passive detection mechanisms. The passive detection mechanism is that a discovery party passively receives the discovery information sent by the surrounding terminals, knows which terminals are nearby after receiving the information and can approximately know the channel quality. The active detection mechanism is that the discovery party actively sends the discovery information, and the surrounding terminals reply the response after receiving the discovery information, to notify the discovery party of their existence surrounding the same.

In the aforementioned technical solution, preferably, the topology discovery response includes node identifier information of a measurement terminal and a measured terminal, which carry out the channel measurement, a time label of the channel measurement, channel feature information and failure feature information.

In the technical solution, the topology discovery response includes, but not limited to, the node identifier information of the measurement terminal and the measured terminal, which carry out the channel measurement, the time label of the channel measurement, the channel feature information and the failure feature information, wherein node identifiers feed back the node identifier information of the measurement terminal and the measured terminal. The time label is time information indicating the completion of the current measurement, and the information can be either absolute time information or relative time information (e.g., increasing serial numbers of maintenance). Failure features are used for representing relevant parameters of the timeliness of the current channel measurement, for example, a moving speed of the terminal and the like, and the network side controls the update frequency of the topological structure maintained by the network side according to the information. The channel feature information is used for representing the state of the channel, and can include pilot frequency receiving quality/strength, a delay evaluation value, etc.

In the aforementioned technical solution, preferably, the processor 1302 is further used for executing the following operations: parsing the failure feature information from the topology discovery response, and judging the time or frequency of updating the database of the topological structure according to the failure feature information.

In the technical solution, when a position change on the terminal side is larger, and when the network side can judge that the position change causes the change of the topological structure, the topological structure can be directly updated, but when the position change on the terminal side is smaller, and when the network side cannot directly judge the change of the topological structure, the time or frequency of updating the database of the topological structure is judged.

In the aforementioned technical solution, preferably, the establishing a data sharing network for direct communication of the terminal corresponding to the data service sharing request according to the data sending path and the destination relay node specifically includes: releasing a path establishment command according to the data sending path and the destination relay node to establish the data sharing network for the direct communication of the terminal corresponding to the data service sharing request according to the released path establishment command.

In the aforementioned technical solution, preferably, the path establishment command includes an identifier of the destination relay node, time-frequency resources where the direct communication of the terminal is located and an effective time of the data sending path.

In the technical solution, the network side releases the time-frequency resources where the direct communication of the terminal is located and the effective time of the data sending path, so that a relay terminal can successfully establish the data sharing network according to the time-frequency resources and the effective time of the data sending path.

In the aforementioned technical solution, preferably, the preset selection principle includes a minimum hop principle, a maximum throughput principle and/or a minimum delay principle.

In the technical solution, the network side carries out path selection according to the maintained database of the topological structure and relevant link feature information. The network side can carry out the path selection according to the following principles or the combination of multiple principles: the minimum hop principle, the maximum throughput principle and the minimum delay principle, etc.

In the aforementioned technical solution, preferably, the processor 1302 is further used for executing the following operations: sending the database of the topological structure to the database of a superior topological structure of the network side through interfaces between the base stations periodically or in a time triggered manner, and receiving the database of the superior topological structure sent by the database of the superior topological structure of the network side; and if there is no data sending path corresponding to the direct communication service request in a current service area corresponding to the network side, sending a path discovery request to the database of the superior topological structure of the network side; or, if there is no data sending path corresponding to the direct communication service request in the current service area corresponding to the network side, broadcasting the path discovery request to the other base stations; or, sending the database of the topological structure to the other base stations through the interfaces between the base stations periodically or in a time triggered manner, and receiving the databases of the corresponding topological structures sent by the other base stations to realize the synchronization of information of the topological structures.

In the technical solution, when there is no available path of a relevant destination terminal in the current service area, the path discovery request is sent to the database of the superior topological structure of the network side to acquire a cross-regional topological structure; or when there is no available path of the relevant destination terminal in the current service area, the path discovery request is broadcasted to neighbor base stations; or the mastered topological information is mutually synchronized through the interfaces between the base stations periodically or in a time triggered manner, so that the service base station has more comprehensive global topological structure information.

Specifically, after the data sharing network is established, in a data sharing process, if the change of the topological structure is detected and the change influences the path having been selected by the current user, a path update request is sent to transfer to other available paths to carry out data sharing so as to guarantee smooth data sharing. The technical solutions of the present invention have been illustrated above in detail in combination with the accompany drawings. By means of the technical solutions of the present invention, massive signaling overheads caused by flooding routing in the existing routing algorithms are avoided by the discovery process of a centralized topological structure, unnecessary signaling overheads caused by broadcast in an overlarge range when the topological structure is established are reduced by means of the constraints of physical position information, and meanwhile the timeliness of the database of the topological structure is improved by using the time label and the failure feature information.

The foregoing descriptions are merely preferred embodiments of the present invention, rather than limiting the present invention. For those skilled in the art, the present invention can have a variety of changes and modifications. Any modifications, equivalent substitutions, improvements and the like made within the spirit and principle of the present invention shall all fall within the protection scope of the present invention.

The invention claimed is:

1. A relay selection routing method based on direct communication of a terminal, applied to a base station, comprising:
   establishing a database of a topological structure of a direct communication terminal on a network side;
   when channel quality of any path in the database of the topological structure is lower than a preset channel quality threshold, updating the database of the topological structure;
   after receiving a direct communication service request, determining a data sending path and a destination relay node corresponding to the direct communication service request according to the database of the topological structure, sender information and receiver information of the direct communication service request and a preset selection principle, comprising:
      under the condition that no data sending path corresponds to the direct communication service request in a current service area corresponding to the network side;
      sending a path discovery request to the database of the superior topological structure of the network side or broadcasting the path discovery request to the other base stations; or
      sending the database of the topological structure to the database of a superior topological structure of the network side through interfaces between the base stations periodically or in a time triggered manner, and receiving the database of the superior topological structure sent by the database of the superior topological structure of the network side; or
      sending the database of the topological structure to the other base stations through the interfaces between the base stations periodically or in a time triggered manner, and receiving the databases of the corresponding topological structures sent by the other base stations to realize the synchronization of information of the topological structures; and
   establishing a direct communication data sharing network corresponding to the direct communication service request according to the data sending path and the destination relay node.

2. The relay selection routing method of claim 1, wherein the establishing a database of a topological structure of a direct communication terminal on a network side comprises:
   sending a topology discovery request to at least one terminal within a coverage of the base station, wherein the at least one terminal carries out a channel measurement according to the topology discovery request;
   receiving a topology discovery response fed back by the at least one terminal after carrying out the channel measurement; and
   establishing the database of the topological structure of the direct communication terminal according to the topology discovery response.

3. The relay selection routing method of claim 2, wherein the topology discovery request comprises at least one of or a combination of:
   a relevant threshold constraining the topology discovery response, time-frequency domain resources of the channel measurement, a potential channel measurement range and a channel measurement mode.

4. The relay selection routing method of claim 3, wherein the channel measurement mode comprises an active channel measurement mode and a passive channel measurement mode, in the active channel measurement mode, each of the at least one terminal actively sends discovery information, and other terminals surrounding each terminal respectively reply discovery response to the corresponding terminal after receiving the discovery information, and each terminal carries out channel evaluation according to the discovery response; and in the passive channel measurement mode, each of the at least one terminal passively receives the discovery information sent by the surrounding other terminals, and each terminal carries out channel evaluation according to the discovery information.

5. The relay selection routing method of claim 1, wherein the establishing a database of a topological structure of a direct communication terminal on a network side comprises:

setting a topology discovery parameter for at least one terminal within a coverage of the base station, wherein the at least one terminal carries out a channel measurement according to the topology discovery parameter;

receiving a topology discovery response fed back by the at least one terminal after carrying out the channel measurement; and establishing the database of the topological structure according to the topology discovery response.

6. The relay selection routing method of claim 5, further comprising:

parsing failure feature information from the topology discovery response, and judging time or frequency of updating the database of the topological structure according to the failure feature information.

7. The relay selection routing method of claim 1, wherein the establishing a data sharing network for direct communication of the terminal corresponding to the data service sharing request according to the data sending path and the destination relay node comprises:

releasing a path establishment command according to the data sending path and the destination relay node to establish the data sharing network for the direct communication of the terminal corresponding to the data service sharing request according to the released path establishment command.

8. The relay selection routing method of claim 7, wherein the path establishment command comprises an identifier of the destination relay node, time-frequency resources where the direct communication of the terminal is located and an effective time of the data sending path.

9. A relay selection router based on direct communication of a terminal, applied to a base station, comprising a processor and a memory, wherein by invoking operation instructions stored in the memory, the processor is used for executing the following operations:

establishing a database of a topological structure of a direct communication terminal on a network side;

when channel quality of any path in the database of the topological structure is lower than a preset channel quality threshold, updating the database of the topological structure;

after receiving a direct communication service request, determining a data sending path and a destination relay node corresponding to the direct communication service request according to the database of the topological structure, sender information and receiver information of the direct communication service request and a preset selection principle, comprising:

under the condition that no data sending path corresponds to the direct communication service request in a current service area corresponding to the network side;

sending a path discovery request to the database of a superior topological structure of the network side or broadcasting the path discovery request to the other base stations; or sending the database of the topological structure to the database of a superior topological structure of the network side through interfaces between the base stations periodically or in a time triggered manner, and receiving the database of the superior topological structure sent by the database of the superior topological structure of the network side; or sending the database of the topological structure to the other base stations through the interfaces between the base stations periodically or in a time triggered manner, and receiving the databases of the corresponding topological structures sent by the other base stations to realize the synchronization of information of the topological structures; and establishing a direct communication data sharing network corresponding to the direct communication service request according to the data sending path and the destination relay node.

10. The relay selection router of claim 9, wherein the establishing a database of a topological structure of a direct communication terminal on a network side comprises:

sending a topology discovery request to at least one terminal within a coverage of the base station, wherein the at least one terminal carries out a channel measurement according to the topology discovery request;

receiving a topology discovery response fed back by the at least one terminal after carrying out the channel measurement; and establishing the database of the topological structure of the direct communication terminal according to the topology discovery response.

11. The relay selection router of claim 10, wherein the topology discovery request comprises at least one of or a combination of:

a relevant threshold constraining the topology discovery response, time-frequency domain resources of the channel measurement, a potential channel measurement range and a channel measurement mode.

12. The relay selection router of claim 11, wherein the channel measurement mode comprises an active channel measurement mode and a passive channel measurement mode, in the active channel measurement mode, each of the at least one terminal actively sends discovery information, and other terminals surrounding each terminal respectively reply discovery response to the corresponding terminal after receiving the discovery information, and each terminal carries out channel evaluation according to the discovery response; and in the passive channel measurement mode, each of the at least one terminal passively receives the discovery information sent by the surrounding other terminals, and each terminal carries out channel evaluation according to the discovery information.

13. The relay selection router of claim 9, wherein the establishing a database of a topological structure of a direct communication terminal on a network side comprises:

setting a topology discovery parameter for at least one terminal within a coverage of the base station, wherein the at least one terminal carries out a channel measurement according to the topology discovery parameter;

receiving a topology discovery response fed back by the at least one terminal after carrying out the channel measurement; and establishing the database of the topological structure according to the topology discovery response.

14. The relay selection router of claim 13, wherein the processor is further used for executing the following operations:

parsing failure feature information from the topology discovery response, and judging time or frequency of updating the database of the topological structure according to the failure feature information.

15. The relay selection router of claim 9, wherein the establishing a data sharing network for direct communication of the terminal corresponding to the data service sharing request according to the data sending path and the destination relay node comprises:

releasing a path establishment command according to the data sending path and the destination relay node to establish the data sharing network for the direct communication of the terminal corresponding to the data service sharing request according to the released path establishment command.

16. The relay selection router of claim 15, wherein the path establishment command comprises an identifier of the destination relay node, time-frequency resources where the direct communication of the terminal is located and an effective time of the data sending path.

\* \* \* \* \*